United States Patent
Dziubinschi et al.

(10) Patent No.: US 10,247,455 B2
(45) Date of Patent: Apr. 2, 2019

(54) CONDENSER RECEIVER DRIER REFRIGERANT FILTER

(71) Applicant: Hanon Systems, Daejeon (KR)

(72) Inventors: Alex Dziubinschi, Dearborn, MI (US); Kastriot Shaska, Northville, MI (US); James L. Smitterberg, Grass Lake, MI (US); Brennan Sicks, Farmington Hills, MI (US)

(73) Assignee: HANON SYSTEMS, Daejeon (KR)

( * ) Notice: Subject to any disclaimer, the term of this patent is extended or adjusted under 35 U.S.C. 154(b) by 264 days.

(21) Appl. No.: 15/208,825

(22) Filed: Jul. 13, 2016

(65) Prior Publication Data
US 2018/0017298 A1    Jan. 18, 2018

(51) Int. Cl.
| F25B 43/00 | (2006.01) |
| B01D 29/00 | (2006.01) |
| B60H 1/32 | (2006.01) |
| B01D 15/26 | (2006.01) |
| B01D 29/52 | (2006.01) |
| B01D 29/03 | (2006.01) |

(52) U.S. Cl.
CPC ............ *F25B 43/003* (2013.01); *B01D 15/26* (2013.01); *B01D 29/0097* (2013.01); *B01D 29/035* (2013.01); *B01D 29/52* (2013.01); *B60H 1/3204* (2013.01); *F25B 43/006* (2013.01); *F25B 2400/16* (2013.01)

(58) Field of Classification Search
CPC .... B01D 29/009; B01D 29/035; B01D 29/33; B01D 29/114; B01D 29/0097; B01D 15/26; B01D 29/52; F25B 43/003; F25B 43/006; F25B 2400/16; B60H 1/3204

USPC .... 210/266, 320, 323.1, 447, 454, 456, 495, 210/499, DIG. 6
See application file for complete search history.

(56) References Cited

U.S. PATENT DOCUMENTS

| 2,934,209 | A | * | 4/1960 | Franck ............... B01D 17/0202 |
| | | | | 210/266 |
| 6,185,959 | B1 | | 2/2001 | Zajac |
| 6,189,333 | B1 | | 2/2001 | Cummings et al. |
| 7,175,769 | B1 | | 2/2007 | Wall et al. |
| 8,959,948 | B2 | | 2/2015 | Armsden et al. |

(Continued)

FOREIGN PATENT DOCUMENTS

| JP | H09166371 A | 6/1997 |
| JP | 2003139438 A | 5/2003 |
| JP | 2013145093 A | 7/2013 |

*Primary Examiner* — Matthew O Savage
(74) *Attorney, Agent, or Firm* — Shumaker, Loop & Kendrick, LLP; James D. Miller (57) ABSTRACT

A receiver drier comprises a housing and a filter unit. The housing includes a moisture absorbing chamber and a longitudinally spaced filter chamber. The filter chamber includes an inlet formed adjacent a first portion of an inner circumferential surface thereof and an outlet formed adjacent a second portion of the inner circumferential surface. The filter unit is received within the filter chamber and includes a main body defining a first filter compartment therein. A first surface of the first filter compartment is defined by a first screen element fluidly coupling an interior of the first filter compartment to an exterior thereof. The flow of the refrigerant enters and exits the first filter compartment while flowing in a direction substantially perpendicular to the longitudinal direction of the receiver drier.

19 Claims, 2 Drawing Sheets

(56) References Cited

U.S. PATENT DOCUMENTS

2003/0121278 A1\* 7/2003 Ichimura ............... F25B 43/003
                                                                     62/474
2008/0006052 A1    1/2008 Ki et al.

\* cited by examiner

CONDENSER RECEIVER DRIER REFRIGERANT FILTER

FIELD OF THE INVENTION

The present invention relates to a condenser receiver drier, and more particularly to a filter unit of the condenser receiver drier.

BACKGROUND OF THE INVENTION

Many modern motor vehicles include an air conditioning system comprising a primary circuit having a compressor, a condenser, an expansion valve, and an evaporator. In some air conditioning systems, the primary circuit further includes a receiver drier disposed between an outlet of the condenser and an inlet into the expansion valve. The receiver drier is configured to store liquid refrigerant of the air conditioning system and to remove undesired moisture from the refrigerant such as water, by using a moisture absorbent material such as a desiccant.

The receiver drier is also typically configured to remove impurities and other contaminants that may be carried by the flow of the refrigerant. Accordingly, the receiver driers of the prior art typically include some form of filter unit disposed therein and are positioned to cause the flow of the refrigerant to encounter at least a portion of the filter unit before exiting the receiver drier. The filter units used in the receiver driers of the prior art may generally include a screen element having openings formed therein for allowing the refrigerant to flow therethrough, whereas the impurities or the contaminants encountering the screen element are embedded in the screen element to prevent passage of the impurities or the contaminants. However, the entrapment of the impurities or the contaminants causes the openings of the screen element to become clogged during an extended period of use, thereby reducing an efficiency of the system including the receiver drier.

One solution to the problem of clogging of the filter unit is to increase an effective surface area of the screen elements to provide the refrigerant with an increased flow area through which to pass when encountering the screen elements. The increase in the effective surface area of the screen elements extends the useful life of the filter unit. However, the size, the shape, and the orientation the filter unit must be carefully chosen to ensure that the refrigerant flowing through the filter unit does not encounter an excessive change in pressure or velocity that could alter an operation of the air conditioning system, to ensure that the filter unit is adapted for the specific configuration of the receiver drier, and to allow the filter unit to be removable and replaceable when the effective life of the filter unit expires due to the accumulation of the impurities and the contaminants carried by the refrigerant.

Many of the receiver driers of the prior art typically include one chamber for receiving the moisture absorbent material, another distinct chamber for receiving the filter unit, and a fluid flow path fluidly coupling the chambers to each other. One possible configuration includes the fluid flow path extending along a central longitudinal axis of the receiver drier before terminating at an outlet disposed within an interior portion of the filter unit, which is in turn surrounded by a screen element of the filter unit. After entering the interior of the filter unit, the refrigerant is caused to flow in a direction radially outwardly from the outlet of the fluid flow path to encounter the screen element before exiting the chamber having the filter unit. Accordingly, the receiver driers of the prior art include an inside-to-outside flow configuration of the filter unit in accordance with the relative positioning of the two distinct chambers and the fluid flow path of the receiver drier.

However, alternative configurations of the receiver drier have been disclosed wherein the fluid flow path connecting the chambers of the receiver drier is disposed along an outer region of a housing of the receiver drier. The arrangement with the fluid flow path disposed along the outer region of the housing causes the refrigerant entering the chamber including the filter unit to initially flow into a region of the chamber disposed outside of the interior of the filter unit, in contrast to the previously described receiver driers including a centrally located fluid flow path that includes an outlet discharging into the interior of the filter unit. Therefore, the receiver drier with the fluid flow path disposed along the outer region of the housing requires an alternate configuration of the filter unit suitable for the flow of the refrigerant to enter the filter unit in a direction transverse to the longitudinal direction of the receiver drier rather than entering the filter unit in a direction parallel to the longitudinal direction of the receiver drier. One example of a receiver drier having the configuration with the fluid flow path disposed along the outer region of the housing can be found in U.S. Pat. No. 8,959,948 to Armsden et al., the disclosure of which is hereby incorporated by reference in its entirety.

It would be desirable to create a filter unit of a receiver drier for use with a condenser of an air conditioning system wherein a packaging size is minimized, an effective surface area of a screen element is maximized to maximize a useful life of the filter unit, and a configuration of the filter unit permits a refrigerant to enter and exit the filter unit in a direction transverse to a longitudinal axis of the receiver drier.

SUMMARY OF THE INVENTION

In accordance with the present invention, a receiver drier having a filter unit configured to filter debris from a flow of a refrigerant while the refrigerant is flowing in a direction substantially perpendicular to a longitudinal axis of the receiver drier is disclosed.

In an embodiment of the current invention, a filter unit for a receiver drier having a flow of refrigerant passing therethrough is disclosed. The receiver drier extends along a longitudinal axis and includes a filter chamber for receiving the filter unit, the filter chamber having an inner circumferential surface. The filter unit comprises a main body defining a first filter compartment therein. A first surface of the first filter compartment is defined by a first screen element fluidly coupling an interior of the first filter compartment to an exterior thereof. The first screen element is configured to filter debris carried by the flow of the refrigerant. The flow of the refrigerant enters and exits the first filter compartment while flowing in a direction substantially perpendicular to the longitudinal axis of the receiver drier.

In another embodiment of the current invention, a receiver drier having a flow of refrigerant passing therethrough is disclosed. The receiver drier comprises a housing and a filter unit. The housing includes a moisture absorbing chamber and a filter chamber spaced from the moisture absorbing chamber in a longitudinal direction of the receiver drier. The filter chamber includes an inlet formed adjacent a first portion of an inner circumferential surface thereof and an outlet formed adjacent a second portion of the inner circumferential surface spaced apart from the first portion thereof. The filter unit is received within the filter chamber and includes a main body defining a first filter compartment therein. A first surface of the first filter compartment is defined by a first screen element fluidly coupling an interior of the first filter compartment to an exterior thereof. The first screen element is configured to filter debris carried by the flow of the refrigerant. The flow of the refrigerant enters and exits the first filter compartment while flowing in a direction substantially perpendicular to the longitudinal direction of the receiver drier.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION OF THE INVENTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Additionally, the dimensions provided in the drawings are merely for purposes of explaining the invention, and are not necessary or critical to operation of the invention unless otherwise stated herein. In respect of the methods disclosed, the steps presented are exemplary in nature, and thus, the order of the steps is not necessary or critical.

Figure 1:
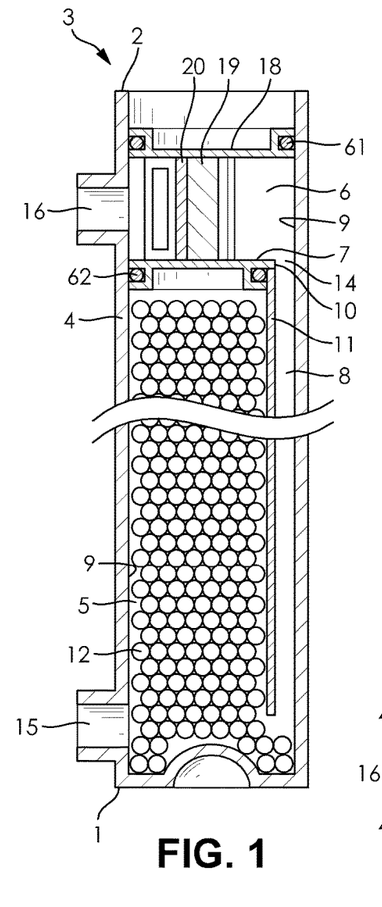
FIG. 1 is a fragmentary cross-sectional elevational view of a receiver drier including a filter unit according to an embodiment of the invention.

FIG. 1 illustrates a receiver drier 3 having a filter unit 20 disposed therein. The receiver drier 3 may form a part of an air conditioning system of a motor vehicle and may be adapted for connection to a condenser (not shown) of the air conditioning system. The receiver drier 3 may be coupled to a header tank (not shown) of the condenser configured to cause a refrigerant flowing through the condenser to be in fluid communication with the receiver drier 3. In other embodiments, the receiver drier 3 is formed integrally with at least a portion of the condenser, as desired.

A housing 4 of the receiver drier 3 forms an elongate tubular member extending from a first end 1 to a second end 2 thereof. The housing 4 defines at least two distinct internal chambers spaced apart from each other in a longitudinal direction of the receiver drier 3. The at least two chambers include a moisture absorbing chamber 5 formed adjacent the first end 1 of the receiver drier 3 and a filter chamber 6 formed adjacent the second end 2 of the receiver drier 3. The moisture absorbing chamber 5 may be separated from the filter chamber 6 by an internal partition 7 extending in a direction perpendicular to a longitudinal direction of the receiver drier 3. The internal partition 7 may extend across only a portion of a cross-section of the receiver drier 3 taken along a plane perpendicular to the longitudinal direction of the receiver drier 3 to cause a flow path 8 to be formed between the moisture absorbing chamber 5 and the filter chamber 6. The flow path 8 may be defined by the cooperation of an outer edge 10 of the internal partition 7 and a portion of an inner circumferential surface 9 of the housing 4 formed opposite the edge 10. In some embodiments, a dividing wall 11 may extend from the outer edge 10 of the internal partition 7 in a direction away from the filter chamber 6 and toward the first end 1 of the receiver drier 3. The dividing wall 11 causes the flow path 8 to be formed by the cooperation of the dividing wall 11 and the inner circumferential surface 9 of the housing 4 along a length of the dividing wall 11, thereby causing the flow path 8 to be elongated in the longitudinal direction of the housing 4. The dividing wall 11 may also form an internal wall defining at least a portion of the moisture absorbing chamber 5.

The housing 4 of the receiver drier 4 is shown as being substantially cylindrical in shape resulting in a substantially circular cross-sectional shape of the inner circumferential surface 9 thereof. However, the term "circumferential" is defined herein as referring to any peripheral boundary for any closed geometric shape, such as a square, a pentagon, a hexagon, or an ellipse, as non-limiting examples.

The moisture absorbing chamber 5 includes an inlet 15 for receiving a flow of the refrigerant from the condenser. The moisture absorbing chamber 5 further includes a moisture absorbent material 12 disposed therein. The moisture absorbent material 12 may be a desiccant, for example. The moisture absorbent material 12 is configured to remove moisture from the refrigerant as the refrigerant flows through the moisture absorbing chamber 5. As shown in FIG. 1, one side of the moisture absorbing chamber 5 may be defined by the dividing wall 11 while the remainder of the moisture absorbing chamber 5 is defined by the inner circumferential surface 9 of the housing 4. However, other configurations of the moisture absorbing chamber 5 and the moisture absorbent material 12 may be used without departing from the scope of the present invention.

The filter chamber 6 includes an inlet 14 formed at an end of the flow path 8 and immediately adjacent the inner circumferential surface 9 of the housing 4. The inlet 14 is shown as being formed in a bottommost surface of the filter chamber 6 between the edge 10 of the internal partition 7 and the inner circumferential surface 9 of the housing 4. However, the inlet 14 may alternatively be formed in a side surface of the filter chamber 6 if a different configuration of the housing 4 is used without departing from the scope of the present invention. In either case, the inlet 14 is positioned to cause the refrigerant to enter the filter chamber 6 along a portion of the inner circumferential surface 9 of the housing 4 formed to a first side of the filter chamber 6.

Figure 3:
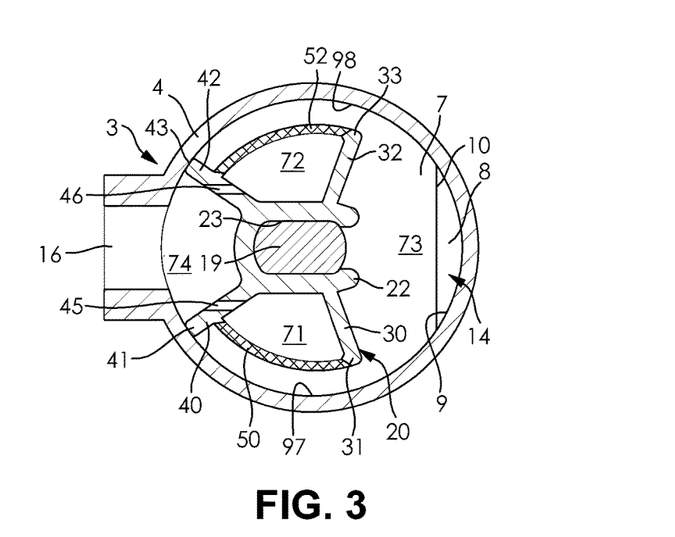
FIG. 3 is an enlarged cross-sectional top plan view of the receiver drier and filter unit illustrated in FIG. 1.

The filter chamber 6 further includes an outlet 16 formed at a second side of the filter chamber 6 opposite the inlet 14. Referring now to FIGS. 1 and 3, the outlet 16 is shown as formed in a portion of the inner circumferential surface 9 of the housing 4 diametrically opposed to a portion of the inner circumferential surface 9 defining at least a portion of the inlet 14. However, the outlet 16 may alternatively be formed in any portion of the housing 4, as long as the outlet 16 is positioned relative to the inlet 14 to cause the refrigerant flowing through the filter chamber 6 to flow at least partially in a direction perpendicular to the longitudinal axis of the receiver drier 3.

The filter chamber 6 may include a removable cap member 18. The cap member 18 may be configured to sealingly close the second end 2 of the receiver drier 3 adjacent the filter chamber 6. Accordingly, the cap member 18 may form an uppermost surface of the filter chamber 6 formed opposite the internal partition 7. The cap member 18 is shown in FIG. 1 as including a first gasket 61 engaging the inner circumferential surface 9 of the housing 4 and configured to prevent the refrigerant from exiting the second end 2 of the receiver drier 3. The internal partition 7 may similarly include a second gasket 62 engaging the inner circumferential surface 9 of the housing 4 as well a portion of the dividing wall 11 and configured to prevent the refrigerant from flowing directly between the moisture absorbing chamber 5 and the filter chamber 6 along a flow path other than the flow path 8. The internal partition 7 may additionally be removed from the receiver drier 3 in conjunction with the filter unit 20 and the cap member 18 to perform maintenance on the receiver drier 3. For example, the cap member 18 may be removed to access the filter unit 20 and the filter unit 20 and the internal partition 7 may be subsequently be removed to gain access to the moisture absorbing chamber 5. In other embodiments, the cap member 18 may alternatively be disposed over the open second end 2 of the receiver drier 3 to close off the second end 2 without departing from the scope of the present invention. For example, the cap member 18 may include an inner circumferential surface configured to engage an outer circumferential surface of the housing 4 adjacent the second end 2 to couple the cap member 18 to the housing 4.

The filter chamber 6 may have side surfaces defined by the inner circumferential surface 9 of the housing 4, a bottommost surface defined by the internal partition 7, and an uppermost surface defined by the cap member 18. Although the filter chamber 6 is shown as substantially cylindrical in shape, it should be understood that the filter chamber 6 may have other shapes without departing from the scope of the present invention as long as the filter chamber 6 is substantially enclosed on all sides with the exception of the inlet 14 and the outlet 16 formed therein.

Figure 2:
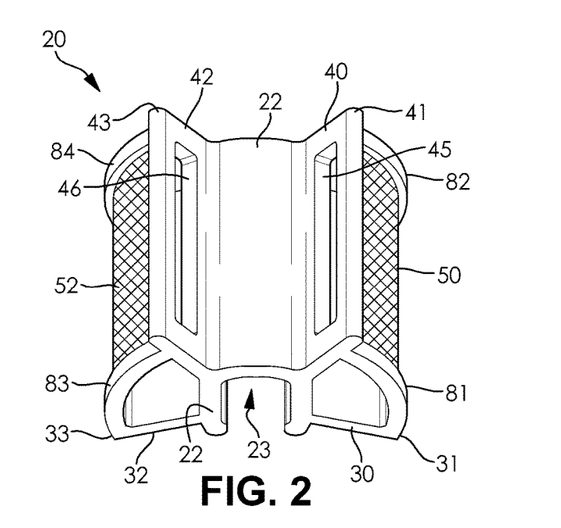
FIG. 2 is a rear perspective view of the filter unit illustrated in FIG. 1.

Referring now to FIGS. 2 and 3, the filter unit 20 is formed from a main body including a central portion 22, a first baffle wall 30, a second baffle wall 32, a first partitioning wall 40, and a second partitioning wall 42. The central portion 22 may be substantially cylindrical in shape. As shown in FIG. 3, the central portion 22 may include a central aperture 23 extending in a longitudinal direction of the central portion 22. The central aperture 23 may be configured to receive a locating feature 19 extending between the internal partition 7 and the cap member 18 to properly locate the filter unit 20 within the filter chamber 6. In some embodiments, the locating feature 19 is formed integrally with at least one of the internal partition 7, the filter unit 20, and the removable cap member 18. At least one of the internal partition 7 and the removable cap member 18 may further include a recess or indentation (not shown) for receiving the locating feature 19. In other embodiments, the central portion 22 is devoid of any form of opening or aperture, as desired, thereby eliminating the use of the locating feature 19.

The first baffle wall 30 extends radially outwardly from the central portion 22 toward a first lateral portion 97 of the inner circumferential surface 9 of the housing 4 and includes a distal end 31 spaced apart from the first lateral portion 97.

The first lateral portion 97 of the inner circumferential surface 9 is formed on a first side of a line extending through the filter chamber 6 from the inlet 14 to the outlet 16 thereof. The second baffle wall 32 extends radially outwardly from the central portion 22 toward a second lateral portion 98 of the inner circumferential surface 9 and includes a distal end 33 spaced apart from the second lateral portion 98. The second lateral portion 98 of the inner circumferential surface 9 is formed on a second side of the line extending from the inlet 14 to the outlet 16 and opposite the first lateral portion 97. Accordingly, the first baffle wall 30 and the second baffle wall 32 may be symmetrically arranged about the line extending from the inlet 14 to the outlet 16 of the filter chamber 6 while each of the first baffle wall 30 and the second baffle wall 32 extends in a direction substantially transverse to the line extending from the inlet 14 to the outlet 16 of the filter chamber 6.

The first baffle wall 30 and the second baffle wall 32 are shown in FIG. 3 as extending at least partially in a direction toward the inlet 14 of the filter chamber 6. An angle formed between the first baffle wall 30 and the second baffle wall 32 may be about 120°, but it should be understood that the angle may vary from that shown without departing from the scope of the present invention. The angle may for example be 90°, 135°, 180°, or 225°, as non-limiting examples.

The first partitioning wall 40 extends radially outwardly from the central portion 22 and includes a distal end 41 contacting the first lateral portion 97 of the inner circumferential surface 9. The second partitioning wall 42 extends radially outwardly from the central portion 22 and includes a distal end 43 contacting the second lateral portion 98 of the inner circumferential surface 9. Accordingly, the first partitioning wall 40 and the second partitioning wall 42 may be arranged symmetrically about the line extending from the inlet 14 to the outlet 16 of the filter chamber 6.

The first partitioning wall 40 and the second partitioning wall 42 are shown in FIG. 3 as extending at least partially in a direction toward the outlet 16 of the filter chamber 6. The distal end 41 of the first partitioning wall 40 contacts the first lateral portion 97 of the inner circumferential surface 9 adjacent a first side of the outlet 16 and the distal end 43 of the second partitioning wall 42 contacts the second lateral portion 98 of the inner circumferential surface 9 adjacent the second side of the outlet 16. An angle formed between the first partitioning wall 40 and the second partitioning wall 42 may be about 60°, but other angles may be used without departing from the scope of the present invention as long as the first partitioning wall 40 and the second partitioning wall 42 straddle the outlet 16 of the filter chamber 6.

The first partitioning wall 40 includes a first opening 45 formed therein at a position between the distal end 41 and the central portion 22. The first opening 45 extends through the first partitioning wall 40 to fluidly couple a first side of the first partitioning wall 40 to a second side thereof. The second partitioning wall 42 includes a second opening 46 formed therein at a position between the distal end 43 and the central portion 22. The second opening 46 extends through the second partitioning wall 42 to fluidly couple a first side of the second partitioning wall 42 to a second side thereof. The first opening 45 and the second opening 46 are shown in FIG. 2 as substantially rectangular in shape, but the first opening 45 and the second opening 46 may have any suitable size and shape for allowing the refrigerant to flow therethrough without experiencing a change in velocity or pressure sufficient to alter operation of the filter unit 20.

The main body of the filter unit 20 further includes a first screen element 50 and a second screen element 52. The first screen element 50 extends from the distal end 31 of the first baffle wall 30 to a portion of the first partitioning wall 40 between the distal end 41 thereof and the first opening 45 thereof. The second screen element 52 extends from the distal end 33 of the second baffle wall 32 to a portion of the second partitioning wall 42 between the distal end 43 thereof and the second opening 46 thereof. The first screen element 50 and the second screen element 52 may each have a substantially arcuate shape substantially corresponding to a shape of the inner circumferential surface 9 of the housing 4. The first screen element 50 and the second screen element 52 may each include a substantially constant radius of curvature along the arcuate portions thereof. As shown in FIG. 2, a first frame element 81 and a second frame element 82 may also extend from the first baffle wall 30 to the first partitioning wall 40 to frame the first screen element 50. Similarly, a third frame element 83 and a fourth frame element 84 may also extend from the second baffle wall 32 to the second partitioning wall 42 to frame the second screen element 52. However, it should be understood that the first screen element 50 and the second screen element 52 may alternatively be formed to have heights substantially equal to heights of the central portion 22, the first baffle wall 30, the second baffle wall 32, the first partitioning wall 40, and the second partitioning wall 42, thereby eliminating the need for the frame elements 81, 82, 83, 84, as desired.

The first screen element 50 and the second screen element 52 are each formed of a mesh or screen material suitable for filtering debris or contaminants contained within the refrigerant flowing through the filter chamber 6. The mesh may form a lattice of repeating structure having a plurality of openings formed therein.

Referring again to FIG. 3, the introduction of the filter unit 20 subdivides the filter chamber 6 into a first filter compartment 71, a second filter compartment 72, an inlet compartment 73, and an outlet compartment 74. The first filter compartment 71 is formed within the filter unit 20 and is defined by a portion of the central portion 22, the first baffle wall 30, a portion of the first partitioning wall 40, and the first screen element 50. The second filter compartment 72 is also formed within the filter unit 20 and is defined by a portion of the central portion 22, the second baffle wall 32, a portion of the second partitioning wall 42, and the second screen element 52. The inlet compartment 73 is defined by a portion of the inner circumferential surface 9 of the housing 4, a portion of the first partitioning wall 40, the first screen element 50, the first baffle wall 30, a portion of the central portion 22, the second baffle wall 32, the second screen element 52, and a portion of the second partitioning wall 42. The outlet compartment 74 is defined by a portion of the central portion 22, the first partitioning wall 40, a portion of the inner circumferential surface 9 of the housing 4, and the second partitioning wall 42. As should be understood, the first filter compartment 71 and the second filter compartment 72 are disposed downstream of the inlet compartment 73 with respect to a direction of the flow of the refrigerant, while the outlet compartment 74 is disposed downstream of the first filter compartment 71 and the second filter compartment 72 with respect to the direction of the flow of the refrigerant.

In use, the refrigerant flows from the condenser of the air conditioning system and enters the moisture absorbing chamber 5 of the receiver drier 3 through the inlet 15 thereof. The moisture absorbing material 12 disposed in the moisture absorbing chamber 5 removes moisture from the refrigerant. The refrigerant then flows through the flow path 8 before entering the inlet compartment 73 of the filter chamber 6 through the inlet 14 thereof. The refrigerant is then divided within the inlet compartment 73 into a first partial flow directed towards the first filter compartment 71 and a second partial flow directed towards the second filter compartment 72.

The first partial flow of the refrigerant enters the first filter compartment 71 through the first screen element 50 while flowing in a direction substantially perpendicular to the longitudinal axis of the receiver drier 3. The first partial flow may flow between the first lateral portion 97 of the inner circumferential surface 9 and the first screen element 50 before changing direction to flow radially inwardly into the first filter compartment 71 through the first screen element 50. The second partial flow of the refrigerant enters the second filter compartment 72 through the second screen element 52 while similarly flowing in a direction substantially perpendicular to the longitudinal axis of the receiver drier 3. The second partial flow may first flow between the second lateral portion 98 of the inner circumferential surface 9 and the second screen element 52 before changing direction to flow radially inwardly into the second filter compartment 72 through the second screen element 52. The first screen element 50 removes debris or impurities carried by the first partial flow of the refrigerant as the first partial flow enters the first filter compartment 71 and the second screen element 52 removes debris or impurities carried by the second partial flow of the refrigerant as the second partial flow enters the second filter compartment 72.

The first partial flow of the refrigerant then exits the first filter compartment 71 through the first opening 45 formed in the first partitioning wall 40 while flowing in a direction substantially perpendicular to the longitudinal axis of the receiver drier 3. The second partial flow of the refrigerant then exits the second filter compartment 72 through the second opening 46 formed in the second partitioning wall 42 while flowing in a direction substantially perpendicular to the longitudinal axis of the receiver drier 3. The first partial flow and the second partial flow are then recombined within the outlet compartment 74 of the filter chamber 6. The combined refrigerant flow then exits the filter chamber 6 through the outlet 16.

The configuration of the filter unit 20 advantageously allows for the flow of the refrigerant to enter and exit the filter unit 20 when flowing in a direction substantially perpendicular to the longitudinal axis of the receiver drier 3, while also providing a maximized effective surface area for removing the debris or the impurities carried by the flow of the refrigerant. The first screen element 50 and the second screen element 52 are formed to have arcuate shapes that beneficially allow for a maximized surface area to be exposed while allowing for a packaging size of the filter unit 20 to be minimized. For example, with reference to FIG. 3, the angle formed between the first baffle wall 30 and the second baffle wall 32 may be selected to ensure that a desired surface area of the first screen element 50 and the second screen element 52 is provided to each side of the central portion 22. When the angle formed between the first baffle wall 30 and the second baffle wall 32 is reduced, each of the screen elements 50, 52 extends through a larger angle of curvature, thereby increasing the effective surface area of each of the screen elements 50, 52 without significantly altering a packaging size of the filter unit 20 relative to the filter chamber 6. The configuration accordingly allows a useful life of the filter unit 20 to be maximized while retaining a small packaging size that does not adversely affect a size of the receiver drier 3 having the filter unit 20.

Figure 4:
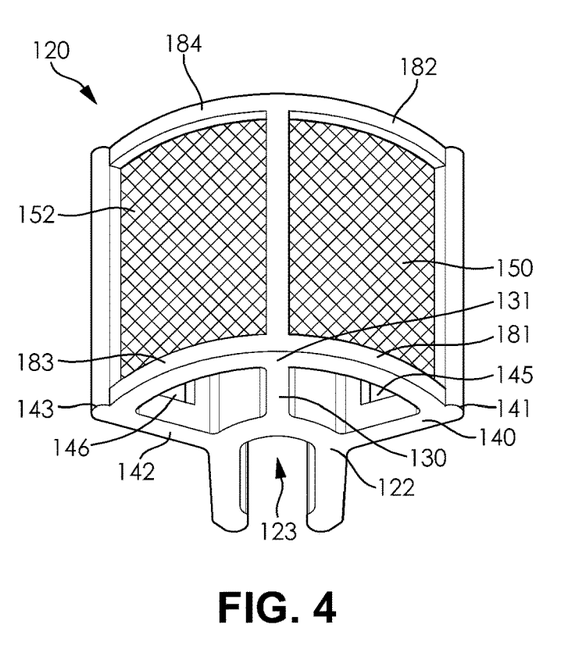
FIG. 4 is a rear perspective view of a filter unit according to another embodiment of the invention.
Figure 5:
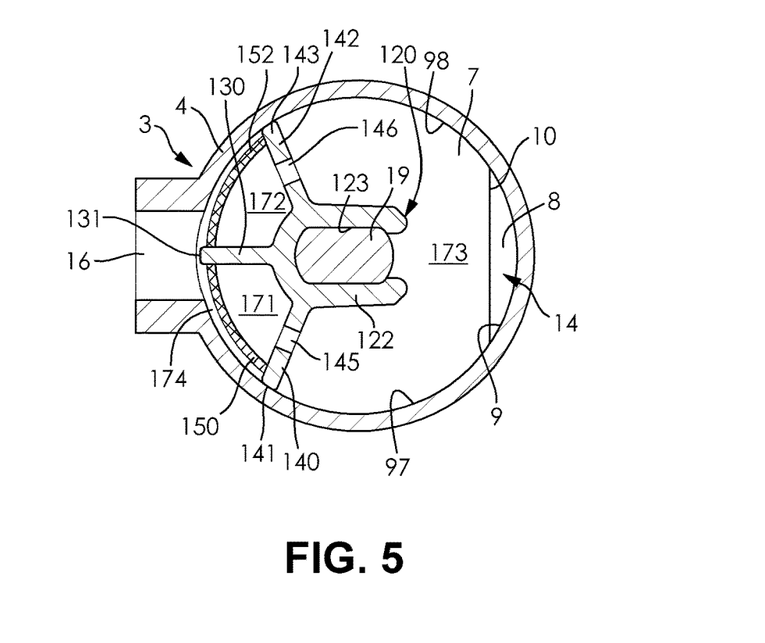
FIG. 5 is an enlarged cross-sectional top plan view of a receiver drier having the filter unit illustrated in FIG. 4.

FIGS. 4 and 5 illustrate a filter unit 120 according to another embodiment of the invention. The filter unit 120 is formed from a main body including a central portion 122, a first baffle wall 130, a first partitioning wall 140, and a second partitioning wall 142. The central portion 122 may be substantially cylindrical in shape. As shown in FIG. 5, the central portion 122 may include a central aperture 123 extending in a longitudinal direction of the central portion 122. The central aperture 123 may be configured to receive the locating feature 19 of the cap member 18. In other embodiments, the central portion 122 is devoid of any form of opening or aperture, as desired.

The first baffle wall 130 extends radially outwardly from the central portion 122 and includes a distal end 131 positioned immediately adjacent the outlet 16 of the filter chamber 6. The first baffle wall 130 may accordingly extend along the line extending from the inlet 14 to the outlet 16 of the filter chamber 6.

The first partitioning wall 140 extends radially outwardly from the central portion 122 and includes a distal end 141 contacting the first lateral portion 97 of the inner circumferential surface 9 of the housing 4. The second partitioning wall 142 extends radially outwardly from the central portion 122 and includes a distal end 143 contacting the second lateral portion 98 of the inner circumferential surface 9. Accordingly, the first partitioning wall 140 and the second partitioning wall 142 may be arranged symmetrically about the line extending from the inlet 14 to the outlet 16 of the filter chamber 6.

The first partitioning wall 140 and the second partitioning wall 142 are shown in FIG. 5 as extending at least partially in a direction toward the outlet 16 of the filter chamber 6. The distal end 141 of the first partitioning wall 140 contacts the first lateral portion 97 of the inner circumferential surface 9 adjacent a first side of the outlet 16 and the distal end 143 of the second partitioning wall 142 contacts the second lateral portion 98 of the inner circumferential surface 9 adjacent the second side of the outlet 16. An angle formed between the first partitioning wall 140 and the second partitioning wall 142 may be about 135°, but other angles may be used without departing from the scope of the present invention as long as the first partitioning wall 140 and the second partitioning wall 142 extend toward opposing sides of the outlet 16.

The first partitioning wall 140 further includes a first opening 145 formed therein at a position between the distal end 141 thereof and the central portion 122. The first opening 145 extends through the first partitioning wall 140 to fluidly couple a first side of the first partitioning wall 140 to a second side thereof. The second partitioning wall 142 further includes a second opening 146 formed therein at a position between the distal end 143 thereof and the central portion 122. The second opening 146 extends through the second partitioning wall 142 to fluidly couple a first side of the second partitioning wall 142 to a second side thereof. The first opening 145 and the second opening 146 may be substantially rectangular in shape, but the first opening 145 and the second opening 146 may have any suitable size and shape for allowing the refrigerant to flow therethrough without experiencing a change in velocity or pressure sufficient to alter operation of the filter unit 120.

The main body of the filter unit 120 further includes a first screen element 150 and a second screen element 152. The first screen element 150 extends from the distal end 131 of the first baffle wall 130 to a portion of the first partitioning wall 140 formed between the distal end 141 thereof and the first opening 145 thereof. The second screen element 152 extends from the distal end 131 of the first baffle wall 130 to a portion of the second partitioning wall 142 formed between the distal end 143 thereof and the second opening 146 thereof. The first screen element 150 and the second screen element 152 may each have a substantially arcuate shape substantially corresponding to a shape of the inner circumferential surface 9 of the housing 4. The first screen element 150 and the second screen element 152 may each have a substantially constant radius of curvature along the arcuate portions thereof.

As shown in FIG. 4, a first frame element 181 and a second frame element 182 may also extend from the first baffle wall 130 to the first partitioning wall 140 to frame the first screen element 150. Similarly, a third frame element 183 and a fourth frame element 184 may also extend from the first baffle wall 130 to the second partitioning wall 142 to frame the second screen element 152. However, the first screen element 150 and the second screen element 152 may alternatively be formed to have heights substantially equal to heights of the first baffle wall 130, the first partitioning wall 140, and the second partitioning wall 142, thereby eliminating the need for the frame elements 181, 182, 183, 184, as desired.

The first screen element 150 and the second screen element 152 are each formed of a mesh or screen material suitable for filtering debris or impurities contained within the refrigerant flowing through the filter chamber 6. The mesh may form a lattice of repeating structure having a plurality of openings formed therein.

Referring again to FIG. 5, the introduction of the filter unit 120 subdivides the filter chamber 6 into a first filter compartment 171, a second filter compartment 172, an inlet compartment 173, and an outlet compartment 174. The first filter compartment 171 is formed within the filter unit 120 and is defined by a portion of the central portion 122, the first baffle wall 130, a portion of the first partitioning wall 140, and the first screen element 150. The second filter compartment 172 is also formed within the filter unit 120 and is defined by a portion of the central portion 122, the first baffle wall 130, the second screen element 152, and a portion of the second partitioning wall 142. The inlet compartment 173 is bounded by a portion of the inner circumferential surface 9 of the housing 4, the first partitioning wall 140, a portion of the central portion 122, and a portion of the second partitioning wall 142. The outlet compartment 174 is bounded by a portion of the inner circumferential surface 9 of the housing 4, the first screen element 150, the second screen element 152, a portion of the first partitioning wall 140, and a portion of the second partitioning wall 142. The arcuate shapes of the first screen member 150, the second screen member 152, and the inner circumferential surface 9 of the housing 4 may result in the outlet compartment 174 being substantially arcuate in shape. As should be understood, the first filter compartment 171 and the second filter compartment 172 are disposed downstream of the inlet compartment 173 with respect to the flow of the refrigerant while the outlet compartment 174 is disposed downstream of the first filter compartment 171 and the second filter compartment 172 with respect to the flow of the refrigerant.

In use, the refrigerant flows from the condenser of the air conditioning system and enters the moisture absorbing chamber 5 of the receiver drier 3 through the inlet 15 thereof. The moisture absorbing material 12 disposed in the moisture absorbing chamber 5 removes moisture from the refrigerant. The refrigerant then flows through the flow path 8 before entering the inlet compartment 173 of the filter chamber 6 via the inlet 14 thereof. The refrigerant is then divided within the inlet compartment 173 into a first partial flow directed towards the first filter compartment 171 and a second partial flow directed towards the second filter compartment 172.

The first partial flow of the refrigerant enters the first filter compartment 171 via the first opening 145 formed in the first partitioning wall 140 while flowing in a direction substantially perpendicular to the longitudinal axis of the receiver drier 3. The second partial flow of the refrigerant enters the second filter compartment 172 via the second opening 146 formed in the second partitioning wall 142 while similarly flowing in a direction substantially perpendicular to the longitudinal axis of the receiver drier 3.

The first partial flow of the refrigerant then exits the first filter compartment 171 via the first screen element 150 while flowing in a direction substantially perpendicular to the longitudinal axis of the receiver drier 3. The first partial flow may then flow between the inner circumferential surface 9 and the first screen element 50 within the outlet compartment 174 after exiting through the first screen element 150. The second partial flow of the refrigerant then exits the second filter compartment 172 via the second screen element 152 while flowing in a direction substantially perpendicular to the longitudinal axis of the receiver drier 3. The second partial flow may then flow between the inner circumferential surface 9 and the second screen element 52 within the outlet compartment 174 after exiting through the second screen element 152. The first screen element 150 screens out any debris or impurities carried within the first partial flow of the refrigerant as the first partial flow exits the first filter compartment 171 and the second screen element 152 screens out any debris or impurities carried within the second partial flow of the refrigerant as the second partial flow exits the second filter compartment 172. The first partial flow and the second partial flow are then recombined within the outlet compartment 174 of the filter chamber 6. The combined refrigerant flow then exits the filter chamber 6 via the outlet 16 thereof.

In similar fashion to the filter unit 20, the configuration of the filter unit 120 advantageously allows for the flow of the refrigerant to enter and exit the filter unit 120 when flowing in a direction substantially perpendicular to the longitudinal axis of the receiver drier 3 while also providing a maximized effective surface area for screening out any impurities or contaminants carried by the flow of the refrigerant. Additionally, the angle formed between the first partitioning wall 140 and the second partitioning wall 142 may accordingly be selected to ensure that each of the screen elements 150, 152 extends through a great enough angle of curvature to expose a desired effective surface area of the screen elements 150, 152 to the flow of the refrigerant without adversely increasing a packaging size of the filter unit 120 relative to the filter chamber 6.

The filter units 20, 120 are beneficially configured to allow for an outside-inside-outside flow pattern consistent with a receiver drier requiring the refrigerant to be filtered while entering and exiting the filter in a direction perpendicular to the longitudinal axis of the receiver drier. The filter units 20, 120 are therefore suitable for use in a variety of different flow configurations while maintaining a relatively small packaging size and a suitably large effective surface area for filtering the refrigerant passing through either of the filter units 20, 120.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A filter unit for a receiver drier having a flow of a refrigerant passing therethrough, the receiver drier having a longitudinal axis and a housing including a filter chamber for receiving the filter unit, the filter chamber defined by an inner circumferential surface of the housing, wherein the filter unit comprises:

a main body defining a first filter compartment therein, a first surface of the first filter compartment defined by a first screen element fluidly coupling an interior of the first filter compartment with an exterior thereof and configured to filter debris carried by the refrigerant, a second surface of the first filter compartment defined by a first baffle wall, and a third surface of the first filter compartment defined by a first partitioning wall, wherein the first partitioning wall includes a first opening formed therein fluidly coupling the interior of the first filter compartment to the exterior thereof, wherein the first screen element extends from a first end of the first baffle wall to a portion of the first partitioning wall disposed between the first opening and a first end of the first partitioning wall, and wherein the refrigerant enters and exits the first filter compartment while flowing in a direction substantially perpendicular to the longitudinal axis of the receiver drier.

2. The filter unit of claim 1, wherein the first screen element is arcuate in shape.

3. The filter unit of claim 1, wherein the first screen element has an arcuate shape corresponding to an arcuate shape of the inner circumferential surface of the housing of the receiver drier.

4. The filter unit of claim 1, wherein the first end of the first baffle wall is spaced from the inner circumferential surface of the receiver drier and the first end of the first partitioning wall contacts the inner circumferential surface of the housing of the receiver drier.

5. The filter unit of claim 1, wherein the main body defines a second filter compartment, a first surface of the second filter compartment defined by a second screen element fluidly coupling an interior of the second filter compartment with an exterior thereof and configured to filter debris carried by the refrigerant, wherein the refrigerant enters and exits the second filter compartment while flowing in a direction substantially perpendicular to the longitudinal axis of the receiver drier.

6. The filter unit of claim 5, wherein the first filter compartment is symmetrical with the second filter compartment with respect to an axis extending between diametrically opposed portions of the inner circumferential surface of the housing of the receiver drier.

7. The filter unit of claim 5, wherein the main body further includes a central portion defining a fourth surface of the first filter compartment and a fourth surface of the second filter compartment.

8. The filter unit of claim 7, wherein the second filter compartment includes a second surface defined by a second baffle wall and a third surface defined by a second partitioning wall.

9. The filter unit of claim 8, wherein the flow of the refrigerant is divided into a first partial flow and a second partial flow, wherein the first partial flow enters the first filter compartment through the first screen element and exits the first filter compartment through said first opening formed in the first partitioning wall and the second partial flow enters the second filter compartment through the second screen element and exits the second filter compartment through a second opening formed in the second partitioning wall.

10. The filter unit of claim 7, wherein the second filter compartment includes a second surface defined by the first baffle wall and a third surface defined by a second partitioning wall.

11. The filter unit of claim 10, wherein the flow of the refrigerant is divided into a first partial flow and a second partial flow, wherein the first partial flow enters the first filter compartment through said first opening formed in the first partitioning wall and exits the first filter compartment through the first screen element, and the second partial flow enters the second filter compartment through a second opening formed in the second partitioning wall and exits the second filter compartment through the second screen element.

12. A receiver drier having a flow of a refrigerant passing therethrough, the receiver drier comprising:
a housing including a moisture absorbing chamber and a filter chamber spaced from the moisture absorbing chamber in a longitudinal direction of the receiver drier, the filter chamber defined by an inner circumferential surface of the housing, the filter chamber including an inlet formed adjacent a first portion of the inner circumferential surface of the housing and an outlet formed adjacent a second portion of the inner circumferential surface of the housing spaced from the first portion thereof; and
a filter unit received within the filter chamber, the filter unit including a main body defining a first filter compartment therein, a first surface of the first filter compartment defined by a first screen element fluidly coupling an interior of the first filter compartment with an exterior thereof and configured to filter debris carried by the refrigerant, a second surface of the first filter compartment defined by a first baffle wall, and a third surface of the first filter compartment defined by a first partitioning wall, wherein the first partitioning wall includes a first opening formed therein fluidly coupling the interior of the first filter compartment to the exterior thereof, wherein the first screen element extends from a first end of the first baffle wall to a portion of the first partitioning wall disposed between the first opening and a first end of the first partitioning wall, and wherein the refrigerant enters and exits the first filter compartment while flowing in a direction substantially perpendicular to the longitudinal direction of the receiver drier.

13. The receiver drier of claim 12, wherein the first screen element extends between the first baffle wall and the first partitioning wall while having an arcuate shape corresponding to a shape of the inner circumferential surface of the housing.

14. The receiver drier of claim 13, wherein the first end of the first baffle wall is spaced apart from the inner circumferential surface of the housing and the first end of the first partitioning wall is in contact with the inner circumferential surface of the housing.

15. The receiver drier of claim 14, wherein the refrigerant enters the filter chamber through the inlet thereof, flows between the inner circumferential surface of the housing and the first screen element before entering the first filter compartment through the first screen element, exits the first filter compartment through the first opening, and exits the filter chamber through the outlet thereof.

16. The receiver drier of claim 14, wherein the refrigerant enters the filter chamber through the inlet thereof, enters the first filter compartment through the first opening, exits the first filter compartment through the first screen element before flowing between the first screen element and the inner circumferential surface of the housing, and exits the filter chamber through the outlet thereof.

17. The receiver drier of claim 12, wherein the main body of the filter unit further defines a second filter compartment arranged symmetric to the first filter compartment relative to a first axis extending between the inlet and the outlet of the filter chamber, a first surface of the second filter compartment defined by a second screen element fluidly coupling an interior of the second filter compartment to an exterior thereof and configured to filter debris carried by the flow of the refrigerant, wherein the flow of the refrigerant enters and exits the second filter compartment while flowing in a direction substantially perpendicular to the longitudinal direction of the receiver drier.

18. The receiver drier of claim 12, wherein the first portion of the inner circumferential surface having the inlet is diametrically opposed to the second portion of the inner circumferential surface having the outlet.

19. A filter unit for a receiver drier having a flow of a refrigerant passing therethrough, the receiver drier having a longitudinal axis and including a filter chamber for receiving the filter unit, the filter chamber defined by an inner circumferential surface of the receiver drier, wherein the filter unit comprises:
a main body including a central portion, a first filter compartment, and a second filter compartment,
wherein a first surface of the first filter compartment is defined by a first screen element fluidly coupling an interior of the first filter compartment with an exterior thereof and configured to filter debris carried by the refrigerant, a second surface of the first filter compartment is defined by the central portion of the main body, a third surface of the first filter compartment is defined by a first baffle wall, and a fourth surface of the first filter compartment is defined by a first partitioning wall,
wherein a first surface of the second filter compartment is defined by a second screen element fluidly coupling an interior of the second filter compartment with an exterior thereof and configured to filter debris carried by the refrigerant, a second surface of the second filter compartment is defined by the central portion of the main body, a third surface of the second filter compartment is defined by a second baffle wall, and a fourth surface of the second filter compartment is defined by a second partitioning wall, wherein the refrigerant enters and exits the second filter compartment while flowing in a direction substantially perpendicular to the longitudinal axis of the receiver drier,
wherein the flow of the refrigerant is divided into a first partial flow and a second partial flow, wherein the first partial flow enters the first filter compartment through the first screen element and exits the first filter compartment through a first opening formed in the first partitioning wall and the second partial flow enters the second filter compartment through the second screen element and exits the second filter compartment through a second opening formed in the second partitioning wall, wherein the refrigerant enters and exits each of the first filter compartment and the second filter compartment while flowing in a direction substantially perpendicular to the longitudinal axis of the receiver drier.

* * * * *